Aug. 4, 1931.  J. W. VAN HORN  1,817,725
COMBINED SEAT AND CUSHION PACK FOR PARACHUTES
Filed Dec. 10, 1930   3 Sheets-Sheet 3
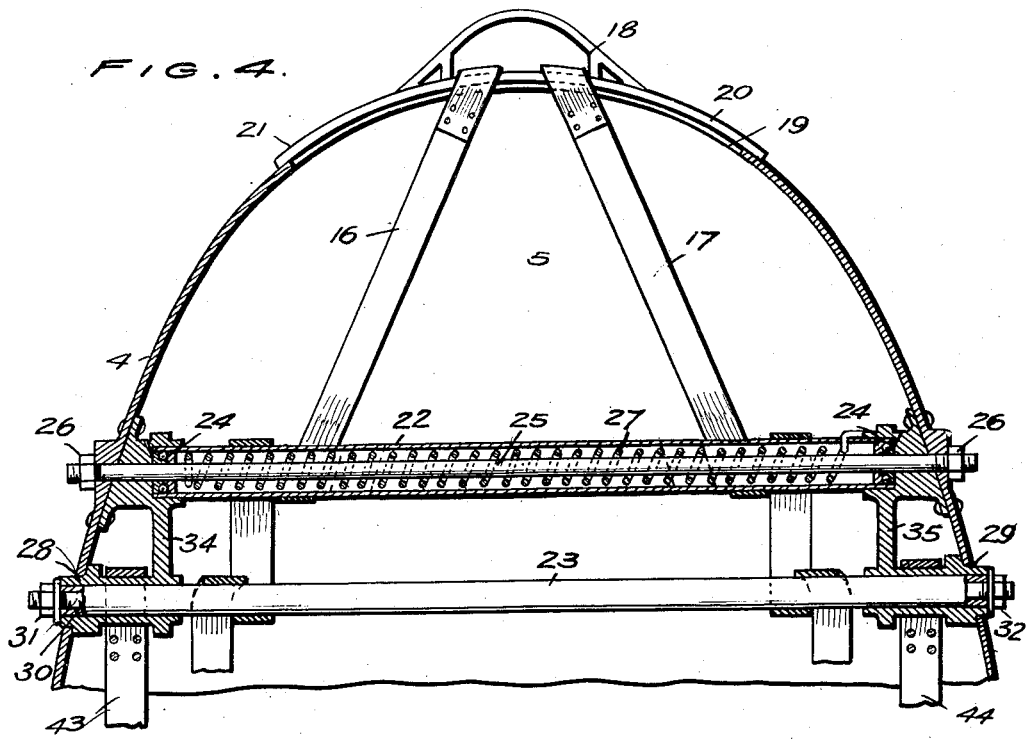
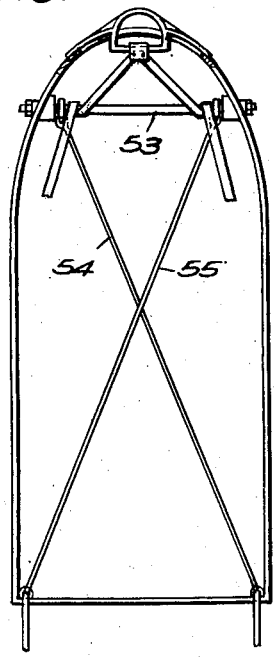
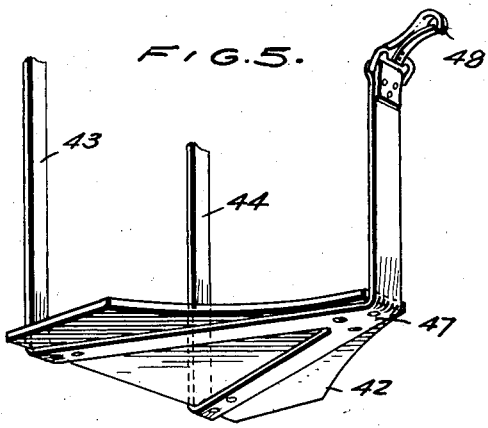
INVENTOR
JOHN W. VAN HORN
BY
ATTORNEY Patented Aug. 4, 1931

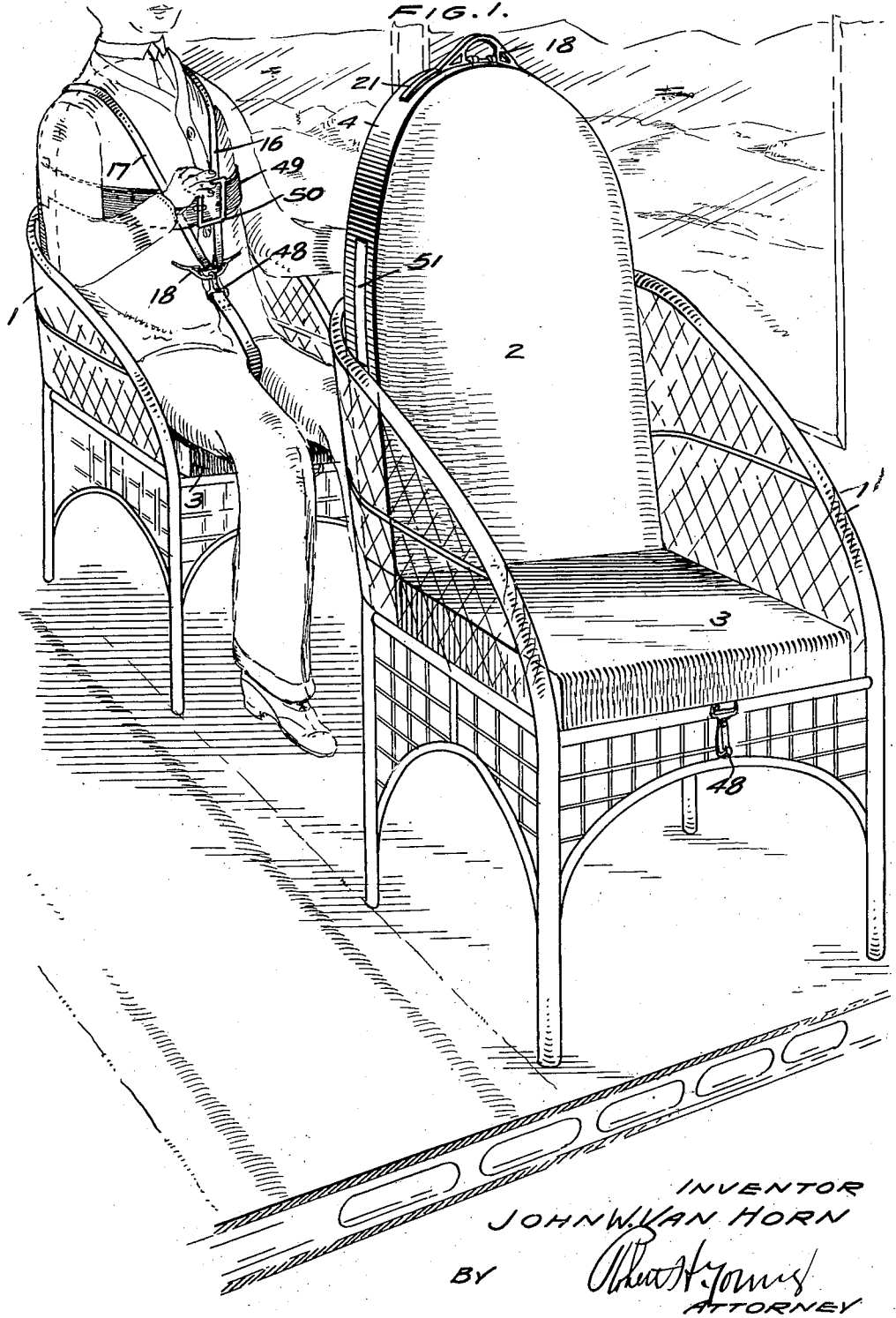

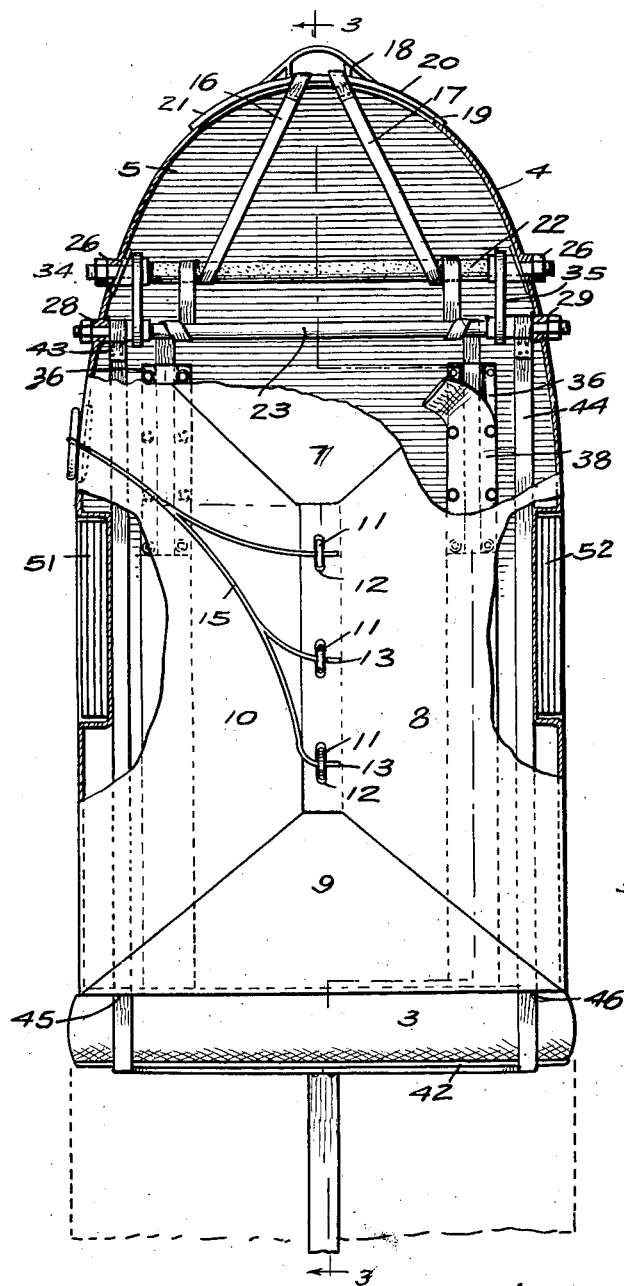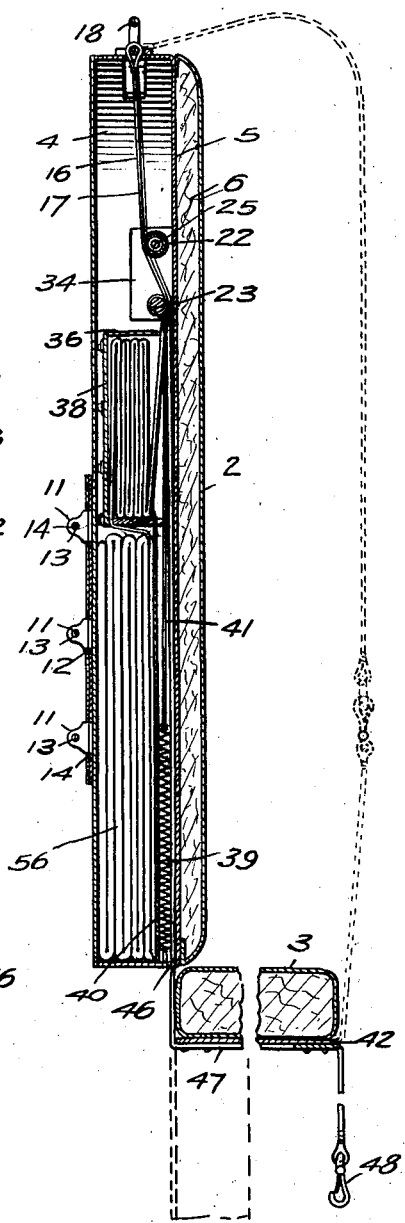

1,817,725

UNITED STATES PATENT OFFICE

JOHN W. VAN HORN, OF SAN DIEGO, CALIFORNIA

COMBINED SEAT AND CUSHION PACK FOR PARACHUTES

Application filed December 10, 1930. Serial No. 501,367.

This invention relates to a combined seat cushion and parachute pack provided with self adjusting parachute harness especially adapted for the use of passengers on aircraft.

The ordinary parachute harness in use today may be obtained in three sizes for different sizes of users but when passenger aircraft are equipped with parachutes it is by no means certain that each passenger will obtain the proper size of harness. Furthermore, the ordinary parachute harness appears somewhat intricate to a novice, and it is oftentimes difficult to teach a novice to secure himself within the harness quickly and properly. An inexperienced person is liable to make some fatal error under the excitement of impending danger. It is therefore desirable to equip passenger aircraft with parachutes having the simplest possible harness, adapted to automatically adjust itself to the size and proportions of the wearer, and also to place the parachute in the most convenient position for speedy attachment to the passenger.

It is an object of this invention to provide a parachute harness which will automatically adjust itself to the size and proportions of the user.

A further object is to combine a parachute and self-adjusting parachute harness with the cushioning of a chair of a passenger aircraft.

A still further object is to provide a parachute harness in which certain of the harness straps are normally retained within the parachute pack but adapted to be drawn out against resilient force for use.

Still another object is to provide a parachute harness comprising straps, the excess length of which will be automatically withdrawn within the parachute pack when released.

Another object is to provide a parachute harness which will be automatically drawn tightly about the body of the user by the functioning of the parachute in descent.

An embodiment illustrating my invention is shown in the accompanying drawings in which Figure 1 is a view of a part of the interior of the cabin of a passenger aircraft provided with chairs having the cushioning thereof equipped with parachutes and self-adjusting harness in accordance with my invention.

Figure 2 is a rear view partly broken away of a seat cushion provided with a parachute and self-adjusting harness.

Figure 3 is a cross-sectional side view of Figure 2.

Figure 4 is an enlarged cross-sectional view of the mechanism shown in the upper part of Fig. 2.

Figure 5 is a perspective view of a detached metallic back strap spacer plate which is normally secured underneath the seat cushion.

Figure 6 shows a back cushion frame provided with a modified harness take-up mechanism and a modified arrangement of back straps.

Referring to Figure 1 which represents a part of the inside of the cabin of a passenger aircraft, the numeral 1 indicates a chair provided with a back cushion 2 and a seat cushion 3. As may be seen in Figure 3, the back cushion is preferably formed with a frame 4 of strong light weight metal, and is provided with a face plate 5 preferably of a similar material. This face plate may be covered with a soft padding 6 to add to the comfort of the passenger.

Within the frame above described there is disposed when not in use a folded parachute 56 of any approved design, a self-adjusting parachute harness, and actuating mechanism for the harness. The back of the frame is normally closed by flexible fabric flaps of a well known type, designated by reference numerals 7, 8, 9 and 10. The edges of the flaps may be held together in the usual releasable manner by means of apertured studs 11 secured to one of the flaps adjacent its edge and extending through slits 12 in the other flaps. The flaps are held on the studs 11 by means of pins 13 extending through apertures 14 in the ends of the studs. Each of the pins 13 is attached to a rip cord 15 or to a branch thereof preferably so as to be simultaneously withdrawn from studs 11 when the user pulls on ring 16 secured to the opposite end of the rip cord from the pins.

The self-adjusting parachute harness previously referred to comprises a pair of body straps 16 and 17 both of which have one end secured to a harness ring 18. These straps are resiliently retained within the housing formed by frame 4, face plate 5, and flaps 7, 8, 9 and 10, but may be manually drawn out through a slot 19 by a pull on harness ring 18. When released the straps are automatically retracted into the housing through slot 19 by mechanism to be described. Harness ring 18 is preferably provided with winglike extensions 20 and 21 to cover over slot 19 to improve the appearance of the cushion and which also serve to prevent the harness ring from being drawn into the housing through the slot.

Within the upper part of the housing a pair of rotatable rollers 22 and 23 are secured. The upper roller 22 may be hollow and carried at its ends on ball bearings 24 on rod 25 the ends of which extend through frame 4 and is held in place by nuts 26. A coil spring 27 is disposed about the rod within roller 22 and one end thereof is connected to the roller while the other is connected to rod 25 in the manner of an ordinary window shade roller. The lower roller 23 is also supported at its ends by the frame 4 and is rotatable within bearings 28 and 29 and on rod 30. The rod and roller are held in position in the bearings by nuts 31 and 32, threaded on the ends of the rod and engaging the roller and bearings. The rollers 22 and 23 are retained in spaced position by sturdy spacing struts 34, 35.

Straps 16 and 17, previously referred to are wound about roller 22 one or more times and then pass to roller 23 and are also wound about this roller one or more times. Other portions of these straps are folded a number of times and are retained in guide pockets 36. From these guides the straps then pass to some means of connection with the parachute shroud lines. The folded shroud lines and the connection means are disposed in the pack adjacent the face plate 5 so that the folded parachute covers them over and are not shown in the drawing. The guide pockets 36 for retaining the folded portions of straps 16 and 17 are provided with fabric covers 38 removably secured thereto by snap fasteners such as ordinary glove fasteners.

The purpose of coil spring 27 in roller 22 is to assist in taking up the slack in straps 16 and 17 when a user harnesses himself to the pack, and also to aid in retracting the straps within the housing when harness ring 18 is released by the user. In order that the turning of roller 22 by spring 27 will exert a pull on the straps the roller may be roughened to eliminate slipping. In addition to this arrangement for retracting the straps, a second and probably more effective device may also be provided for this purpose. This device comprises a coil spring 39 secured at one end to the bottom plate of frame 4 and retained in a guide tube 40. The other end of this spring is attached to a strap 41 which is sewed or otherwise secured to strap 17 at a point adjacent roller 23 when retracted. A similar device would of course be provided for strap 16.

Seat cushion 3 has a light weight metal plate 42 of a generally triangular shape secured to its underneath side. A pair of back straps 43 and 44 are secured to bearings 28 and 29 respectively and pass downwardly therefrom adjacent face plate 5 and out of the housing through a pair of openings 45 and 46 in the bottom plate of frame 4. The back straps are secured to plate 42 in spaced relation to each other adjacent its rear edge and then converge forwardly and are joined into a single strap adjacent the front edge of the plate as indicated by numeral 47. This single strap extends beyond the seat cushion and has a strong snap fastener 48 attached to its end. Snap fastener 48 is intended to be engaged with harness ring 18 when the user is harnessed to the parachute pack.

An additional means for securing the parachute pack to the wearer comprises a safety belt 49 provided with a heavy buckle 50. The ends of the safety belt are securely fastened to the frame 4 of the pack housing preferably within pockets 51 and 52 formed by recesses in the sides of frame 4. When not in use the halves of the safety strap may be rolled up or folded and placed in these recesses out of the way.

A modified form of a roller and back straps are shown in Fig. 10. As shown, a single roller 53 may be provided instead of the pair of rollers shown in Figs. 2, 3 and 4. The back straps 54 and 55 may cross each other and may be secured to the bearings of the roller by passing through metallic eyes instead of passing around the bearings.

The operation of the device is as follows: The passenger seats himself on cushion 3, grasps harness ring 18 with one hand and pulls the same over his head and downwardly to the position shown in dotted lines in Fig. 3. He then grasps snap fastener 48 and raises the same between his legs and engages it with harness ring 18. He should also fasten safety strap 49 about his body by buckling buckle 50. The harness is shown properly in position in Fig. 1. It is obvious that when harness ring 18 is moved to this position, straps 16 and 17 will be drawn outwardly through slot 19 of frame 4. This will rotate rollers 22 and 23 in opposite directions and will wind up spring 27 in roller 22. The pulling of these straps will draw one or more folds thereof from guide pockets 36 and will also pull straps 41 upwardly thereby tensioning springs 39. As soon as the passenger releases his grasp upon harness ring 18, after attachment to fastener 48, the spring roller 22 and springs 39 will tend to retract straps 16 and 17 within the housing, thereby causing the straps to be drawn snugly about the body of the passenger, regardless of his size or proportions.

Should it become necessary to use the parachute as a means of descent from a disabled aircraft, the passenger would rise from his seat, and proceed to the exit. The cushions 2 and 3 and the parachute contained therein, being bound to the passenger by the harness, will be carried along by the passenger. He will then launch himself through the exit into the air and when clear of the craft will pull upon the rip cord ring. The pins 13 will thereby be withdrawn from studs 11 and flaps 7, 8, 9 and 10 released, thus opening the pack and permitting the parachute to open. As the parachute catches in the air it will pull the folded portions of the straps 16 and 17 from guide pockets 36. The pull upon the straps would, of course, instantly remove covers 38 from the guide pockets. This pull upon straps 16 and 17 would be transmitted about rollers 22 and 23 to the portions of the straps engaging the body of the rider and the straps will be drawn tightly about the rider and eliminate the possibility of his slipping out of the harness.

If the flight is successfully completed, so that the parachute need not be brought into action, the passenger may disengage himself from the harness merely by unbuckling the safety strap buckle 50 and releasing snap fastener 48 from harness ring 18. When the harness ring is released spring roller 22 and spring 39, both being under tension, will draw straps 16 and 17 back into the housing through slot 19 and into their original positions.

I claim:

1. In a parachute pack a housing, a roller in the housing, a parachute in the housing, a harness strap attached to said parachute and engaging said roller, yieldable means tending to retain said strap in said housing but permitting withdrawal of a part thereof from the housing.

2. In a parachute pack a housing, a parachute disposed therein, a harness strap attached to said parachute, means for resiliently retaining said strap in said housing but permitting a part thereof to be drawn out of the housing for attachment to a person.

3. In a parachute pack a housing comprising spaced rigid side walls, a parachute disposed therein, a roller secured at its ends to said walls, a harness strap engaging said roller and attached to said parachute.

4. In a parachute pack comprising a housing having rigid side walls, a pair of rollers secured to said walls, means supplementing said walls for retaining said rollers in spaced relation, a parachute in said housing, and a harness strap adapted to be secured to a person, said strap engaging said rollers and attached to said parachute.

5. In a combined parachute pack and harness, a housing providing a parachute space in its lower part, a hollow roller in the upper part of the housing, bearings for said roller permitting rotation, a coil spring in said roller attached at one end to said roller and at the other end to a fixed element, a harness strap guide pocket, and a harness strap engaging said roller and having a portion disposed in said guide pocket.

6. In a combined parachute pack and harness, a housing provided with a slot, a parachute in said housing, a harness strap in said housing connected with said parachute and adapted to be partially withdrawn from the housing through said slot, and resilient means yieldingly opposing said withdrawal and tending to return the strap to within the housing.

7. A combined parachute pack and chair cushion comprising a hollow back cushion constituting a parachute housing, a parachute disposed therein, a harness disposed in said housing when out of use, resilient means permitting a part of the harness to be drawn out of the housing for use and for automatically returning the harness to within the housing when released.

8. A parachute pack comprising a housing having releasable back flaps, a parachute disposed in the housing, a harness strap attached to the parachute, a spring in said housing operatively connected with said strap to permit a portion of said strap to be drawn from the housing for use and to return the same to within the housing when not in use.

9. In a combined chair cushioning, parachute and harness, a hollow back cushion, a seat cushion, a rigid plate secured to said seat cushion, a back strap extending within said hollow back cushion and secured therein and extending adjacent said rigid plate and secured thereto.

10. In a parachute pack, a housing comprising a metallic frame having side plates, pockets formed in said side plates, a safety belt comprising two sections, each section being secured to said frame in proximity to a pocket in positions permitting the sections to be folded and disposed in said pockets.

11. In a parachute pack a housing comprising sides and a face plate, a parachute in said housing, a cushion secured on said face plate, a harness at least partially enclosed within said housing, a pair of back straps attached to said housing in spaced relation, a seat cushion, a metallic plate secured to said cushion, said straps being attached to said plate in spaced relation adjacent its rear edge and converging forwardly.

In testimony whereof I affix my signature.

JOHN W. VAN HORN.